(12) United States Patent
Tsukada et al.

(10) Patent No.: US 12,083,881 B2
(45) Date of Patent: Sep. 10, 2024

(54) VEHICLE DRIVING SYSTEM

(71) Applicants: SUBARU CORPORATION, Tokyo (JP); AUTOLIV DEVELOPMENT AB, Vargarda (SE); PANASONIC HOLDINGS CORPORATION, Osaka (JP)

(72) Inventors: Noriyuki Tsukada, Tokyo (JP); Ryosuke Kubo, Tokyo (JP); Masahito Sekine, Tokyo (JP); Syunsuke Kanagami, Yokohama (JP); Osamu Takahashi, Yokohama (JP); Takateru Sawada, Osaka (JP); Kenji Makino, Osaka (JP); Shogo Maenaka, Osaka (JP)

(73) Assignees: SUBARU CORPORATION, Tokyo (JP); AUTOLIV DEVELOPMENT AB, Vargarda (SE); PANASONIC HOLDINGS CORPORATION, Osaka (JP)

( * ) Notice: Subject to any disclaimer, the term of this patent is extended or adjusted under 35 U.S.C. 154(b) by 401 days.

(21) Appl. No.: 17/516,135

(22) Filed: Nov. 1, 2021

(65) Prior Publication Data

US 2022/0134876 A1  May 5, 2022

(30) Foreign Application Priority Data

Nov. 2, 2020 (JP) .................................. 2020-183953

(51) Int. Cl.
*B60K 28/04* (2006.01)
*B60K 31/00* (2006.01)
(Continued)

(52) U.S. Cl.
CPC .............. *B60K 28/04* (2013.01); *B60K 31/00* (2013.01); *G06F 3/0416* (2013.01); *G06F 3/044* (2013.01);
(Continued)

(58) Field of Classification Search
CPC .................... B60K 28/04; B60K 31/00; B60K 2031/0091; G06F 3/0416; G06F 3/044; G07C 5/0808; G07C 5/0816; B62D 1/046
See application file for complete search history.

(56) References Cited

U.S. PATENT DOCUMENTS 7,567,240 B2 * 7/2009 Peterson, Jr. ......... G06F 3/0444
345/173
9,067,618 B2 * 6/2015 Cash ...................... B62D 1/046
(Continued)

FOREIGN PATENT DOCUMENTS

JP         5009473 B2    8/2012
JP     2019-014447 A    1/2019

*Primary Examiner* — Gertrude Arthur Jeanglaude
(74) *Attorney, Agent, or Firm* — Rimon P.C.

(57) ABSTRACT

A vehicle driving system to be provided in a vehicle includes a touch sensor and a control unit. The touch sensor is to be provided in the steering operation device and configured to measure a fluctuation in electrostatic capacitance. The control unit determines, based on information from the touch sensor, whether a driver of the vehicle is in a steering-holding state or in a non-steering-holding state. After a detection of a first fluctuation that is a fluctuation in the electrostatic capacitance occurring before a malfunction of the touch sensor, the control unit determines that the driver is in the non-steering-holding state even if the information from the touch sensor to the control unit indicates that the driver is in the steering-holding state.

17 Claims, 5 Drawing Sheets

(51) Int. Cl.
  *G06F 3/041* (2006.01)
  *G06F 3/044* (2006.01)
  *G07C 5/08* (2006.01)
  *B62D 1/04* (2006.01)

(52) U.S. Cl.
  CPC ......... *G07C 5/0808* (2013.01); *G07C 5/0816* (2013.01); *B60K 2031/0091* (2013.01); *B62D 1/046* (2013.01)

(56) References Cited

U.S. PATENT DOCUMENTS

| | | | |
|---|---|---|---|
| 11,156,515 B2* | 10/2021 | Kojo | G05D 1/0088 |
| 11,794,800 B2* | 10/2023 | Nozoe | G01V 3/088 |
| 2003/0189493 A1 | 10/2003 | Klausner et al. | |
| 2008/0047764 A1* | 2/2008 | Lee | G06F 3/0418 |
| | | | 178/18.06 |
| 2008/0066994 A1* | 3/2008 | Fujita | B62D 5/0463 |
| | | | 701/43 |
| 2011/0134076 A1* | 6/2011 | Kida | G06F 3/0412 |
| | | | 345/174 |
| 2021/0001914 A1* | 1/2021 | Okayasu | B60K 35/00 |

* cited by examiner

# VEHICLE DRIVING SYSTEM

CROSS-REFERENCE TO RELATED APPLICATIONS

This application is based on and claims priority under 35 USC 119 from Japanese Patent Application No. 2020-183953 filed on Nov. 2, 2020, the contents of which are incorporated herein by reference.

The disclosure relates to a vehicle driving system, and particularly, to a vehicle driving system in which steering-holding state or non-steering-holding state of a driver is detected based on an output of a touch sensor provided in a steering operation device such as a steering wheel so as to ensure safety and to assist driving.

In recent vehicles, various types of automated driving systems have been proposed in order to reduce a burden on a driver and enable comfortable and safe driving. Some of the automated driving systems have already been put into practical use. In the automated driving system, the driver can temporarily release a hand of the driver from a steering operation device.

However, when a factor that interferes with the automated driving system appears, for example, when an interruption by another vehicle, idling of a tire, a malfunction of an external monitoring device such as a camera, a system malfunction, or the like occurs, the driver needs to operate the steering operation device to intervene in driving. That is, by installing an automated driving function in the vehicle, the steering operation device is being changed from a device which is always gripped by the driver to a device which is gripped as needed.

Therefore, in the vehicle including the automated driving system, a sensor may be provided in the steering operation device, it is constantly detected whether the driver is holding the steering operation device or not based on an output of the sensor.

Japanese Patent (JP-B) No. 5009473 and Japanese Unexamined Patent Application Publication (JP-A) No. 2019-14447 disclose a detection of a steering-holding state of a driver in which a touch sensor (a pressure sensor, a capacitance sensor, an electrode pair, or the like) is provided on a rim of a steering operation device and in which a gripping of the steering operation device by the driver and a gripping position are detected.

SUMMARY

An aspect of the disclosure provides a vehicle driving system to be provided in a vehicle. The vehicle driving system is configured to determine whether a driver who drives the vehicle is in a steering-holding state or is in a non-steering-holding state. The steering-holding state is a state in which the driver is holding a steering operation device. The non-steering-holding state is a state in which the driver is not holding the steering operation device. The vehicle driving system includes a touch sensor and a control unit. The touch sensor is to be provided in the steering operation device and configured to measure a fluctuation in electrostatic capacitance. The control unit determines, based on information received from the touch sensor, whether the driver is in the steering-holding state or in the non-steering-holding state. After the control unit detects a first fluctuation that is a fluctuation in the electrostatic capacitance occurring before a malfunction of the touch sensor, the control unit makes a determination that the driver is in the non-steering-holding state even if the information received from the touch sensor to the control unit indicates that the driver is in the steering-holding state.

An aspect of the disclosure provides a vehicle driving system to be provided in a vehicle. The vehicle driving system includes a touch sensor, a memory, and a processor. The touch sensor is to be provided in a steering operation device of the vehicle and configured to measure a fluctuation in electrostatic capacitance. The memory stores instructions. The processor is configured to execute the instructions. The instructions cause the processor to perform determining whether a driver who drives the vehicle is in a steering-holding state or in a non-steering-holding state based on information from the touch sensor. The instructions cause the processor to perform detecting a first fluctuation that is a fluctuation in the electrostatic capacitance occurring before a malfunction of the touch sensor. The instructions cause the processor to perform determining, after a detection of the first fluctuation, that the driver is in the non-steering-holding state even if the information from the touch sensor indicates that the driver is in the steering-holding state. The steering-holding state is a state in which a driver of the vehicle is holding the steering operation device, and the non-steering-holding state is a state in which the driver is not holding the steering operation device.

BRIEF DESCRIPTION OF DRAWINGS

The accompanying drawings are included to provide a further understanding of the disclosure and are incorporated in and constitute a part of this specification. The drawings illustrate an embodiment and, together with the specification, serve to explain the principles of the disclosure.

DESCRIPTION

Figure 1A:
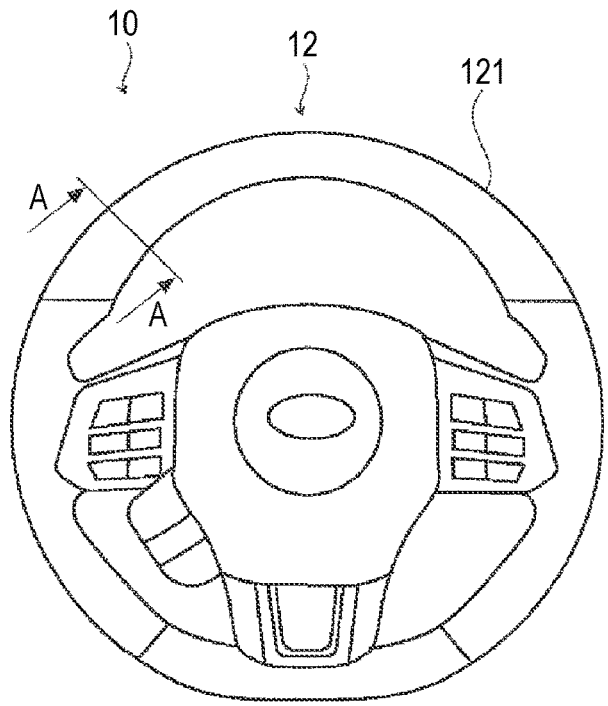
FIG. 1A illustrates a steering operation device relating to a vehicle driving system.

The system described in each of JP-B No. 5009473 and JP-A No. 2019-14447 has room for improvement from the viewpoint of accurately detecting steering-holding state or non-steering-holding state.

Specifically, a touch sensor is provided along a circumferential direction of a rim of a steering operation device such as a steering wheel. The touch sensor is formed by sandwiching insulating layers among a plurality of electrode layers, and the electrode layers are structured by fiber conductive material formed of plated cloth. The touch sensor is more strongly tightened by a skin layer at a rim portion of the steering operation device. Therefore, when the fiber conductive material is broken due to aged deterioration, it may be difficult to accurately determine the steering-holding state or the non-steering-holding state by the touch sensor. In this case, a signal indicating steering-holding state may be output from the touch sensor even in a case of being in the non-steering-holding state actually, and it may not be possible to accurately determine the steering-holding state or the non-steering-holding state.

It is desirable to provide a vehicle driving system capable of accurately detecting steering-holding state or non-steering-holding state.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Hereinafter, a vehicle driving system 11 according to an embodiment will be described in detail with reference to the drawings.

In the following description, the same members are denoted by the same reference numerals in principle, and the repeated description thereof is omitted.

Since the vehicle driving system 11 may be provided in a vehicle 10 having an automated driving function, an automated driving level of the automated driving function will be described first.

The automated driving level is defined in J3016 of SAE International and JASO TP 18004, which is a Japanese reference translation of J3016, and is classified from a level 0 to a level 5 as follows.

The level 0 is referred to as no driving automation or manual driving, and specifically, a driver executes all dynamic driving tasks. The level 1 is referred to as driver assistance, and specifically, the system executes a subtask of vehicle motion control in either one of a longitudinal direction and a lateral direction in a limited region. The level 2 is referred to as partial driving automation, and specifically, the system executes a subtask of vehicle motion control in both the longitudinal direction and the lateral direction in the limited region. The level 3 is referred to as conditional operation automation, and specifically, when it is difficult for the system to execute all the dynamic driving tasks in the limited region and continue the operation, a user appropriately responds to an intervention request or the like of the system. The level 4 is referred to as advanced driving automation, and specifically, in the limited region, the system executes all the dynamic driving tasks and responses to a case in which it is difficult to continue the operation. The level 5 is referred to as full driving automation, and specifically, the system executes all the dynamic driving tasks and responses to the case in which it is difficult to continue the operation.

High level automated driving and low level automated driving according to the embodiment are relative levels of automated driving. That is, the high level automated driving has a higher level of automated driving than the low level automated driving, and for example, when the high level automated driving is the level 5, the low level automated driving is any one of the level 4 to the level 0.

Here, for example, driving of the level 5 is also referred to as fully automated driving, driving of the level 4 to the level 1 is also referred to as semi-automated driving, and driving of the level 0 is also referred to as manual driving. The vehicle 10 according to the embodiment can travel between the level 0 and the level 5.

The vehicle driving system 11 according to the embodiment is provided in the vehicle 10, and is configured to determine whether the driver is in steering-holding state that is a state in which the driver is holding a steering operation device 12 (see FIG. 1A) or is in non-steering-holding state that is a state in which the driver is not holding the steering operation device 12. Examples of the steering operation device 12 include a steering wheel. The vehicle driving system 11 includes a touch sensor 125 that is provided in the steering operation device 12 (see FIGS. 1B and 1C) and that is configured to measure a fluctuation in electrostatic capacitance, and a steering ECU 14 (see FIG. 2) configured to determine whether the driver is in the steering-holding state or the non-steering-holding state based on information received from the touch sensor 125. Furthermore, as will be described later with reference to FIG. 5 and the like, when the steering ECU 14 detects a first fluctuation that is a fluctuation in electrostatic capacitance occurring before a malfunction of the touch sensor 125, the steering ECU 14 then determines that the driver is in the non-steering-holding state even if the information received from the touch sensor 125 to the steering ECU 14 indicates that the driver is in the steering-holding state.

Here, the steering-holding state and the non-steering-holding state will be described. The steering-holding state is a state in which the driver is holding the steering operation device 12 (see FIG. 1A). The vehicle driving system 11 determines, by performing sensing with the touch sensor 125 to be described later, that the driver is in the steering-holding state based on the driver bringing a plurality of fingers, for example, a plurality of predetermined fingers, into contact with a surface of the steering operation device 12. On the other hand, the non-steering-holding state is a state in which the driver is not holding the steering operation device 12 in principle. The vehicle driving system 11 determines, by performing the sensing with the touch sensor 125 to be described later, that the driver is in the non-steering-holding state when the driver is not in contact with the steering operation device 12 or the number of the fingers of the driver in contact with the steering operation device 12 is less than a predetermined value. Here, gripping refers to a state in which the driver firmly grips one side or both sides of the steering operation device 12 with both hands or one hand, and is a concept included in the steering-holding state.

Figure 1B:
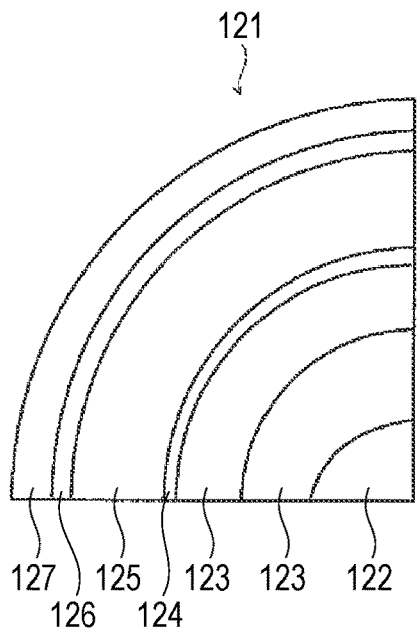
FIG. 1B illustrate a cross section of a part of the steering operation device.
Figure 1C:
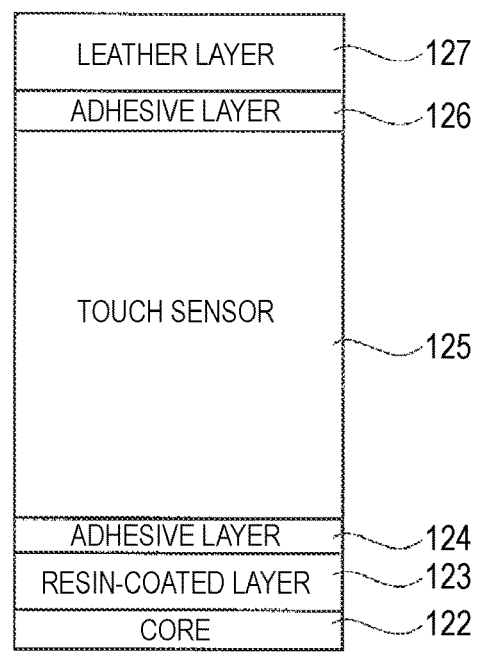
FIG. 1C illustrate a cross section illustrating the cross section of FIG. 1B in more detail.

FIG. 1A illustrates the steering operation device 12, FIG. 1B is a cross-sectional view taken along a line A-A in FIG. 1A, and FIG. 1C illustrates a cross section of the steering operation device 12 in more detail.

Referring to FIG. 1A, the steering operation device 12 includes a rim 121 formed in a substantially annular shape, and the rim 121 includes the touch sensor 125 to be described later.

Referring to FIG. 1B and FIG. 1C, the rim 121 includes, from a center side of the rim 121, a core 122, a resin-coated layer 123, an adhesive layer 124, the touch sensor 125, an adhesive layer 126, and a leather layer 127. The resin-coated layer 123 to the leather layer 127 wind the core 122 in a layered manner in this order.

The touch sensor 125 is formed by sandwiching insulating layers (not shown here) among a plurality of electrode layers, measures electrostatic capacitance, and outputs an electric signal indicating an electrostatic capacitance value. The touch sensor 125 is configured to detect a change in the electrostatic capacitance value when a hand or a finger of the driver, which is a dielectric material, touches the rim 121. As an electrode layer forming the touch sensor 125, a fiber conductive material formed of a plated cloth may be used. Since the fiber conductive material has higher flexibility as compared with other conductive materials, the fiber conductive material can satisfactorily follow the core 122.

On the other hand, since the fiber conductive material forming the touch sensor 125 is tightly fastened by the leather layer 127, it may be difficult to accurately detect the electrostatic capacitance value by the touch sensor 125 if thin fibers constituting the fiber conductive material are broken due to aged deterioration or the like.

If the detection of the electrostatic capacitance value executed by the touch sensor 125 becomes inaccurate, the steering ECU 14 may misjudge a situation which is actually in the non-steering-holding state as the steering-holding state. In such case, even if the actual situation is the non-steering-holding state, the level of automated driving may shift from the high level automated driving to the low level automated driving. Moreover, so-called hand releasing driving may be allowed.

In the vehicle driving system 11 according to the embodiment, as will be described later, the first fluctuation and the second fluctuation that indicate the malfunction of the touch sensor 125 are detected. When the first fluctuation or the second fluctuation is detected, by fixing the subsequent determination to the non-steering-holding state, it is prevented to misjudge the non-steering-holding state as the steering-holding state.

Figure 2:
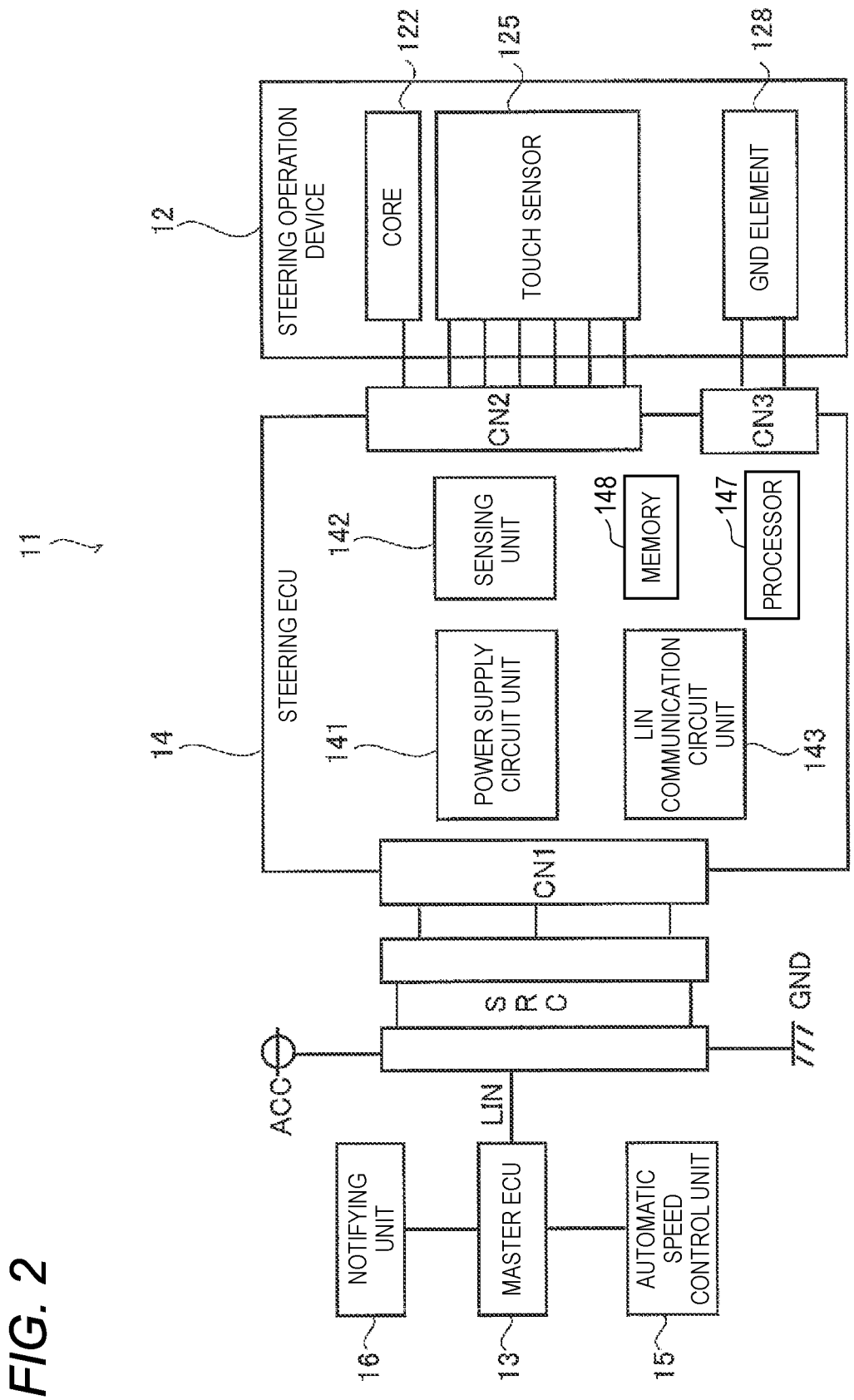
FIG. 2 is a block diagram illustrating a connection configuration of the vehicle driving system.

FIG. 2 is a block diagram illustrating a connection configuration of the vehicle driving system 11.

The vehicle driving system 11 mainly includes the touch sensor 125 and the steering ECU 14. The touch sensor 125 is built in the steering operation device 12.

As described above, the steering operation device 12 includes the core 122, the touch sensor 125, and a GND element (ground element) 128. The core 122 and the touch sensor 125 are coupled to the steering ECU 14 via a CN2 (connector-2). The GND element 128 is coupled to the steering ECU 14 via a CN3 (connector-3).

The steering ECU 14 is a control unit including a CPU (processor 147), a memory 148, and the like, and includes a power supply circuit unit 141, a sensing unit 142, and a LIN communication circuit unit (Local Interconnect Network communication circuit unit) 143. The power supply circuit unit 141 is configured to distribute electric power received from the outside to each portion of the steering ECU 14 at an appropriate voltage. The sensing unit 142 is configured to determine whether the driver is in the steering-holding state or in the non-steering-holding state based on a signal indicating the electrostatic capacitance value received from the touch sensor 125. The LIN communication circuit unit 143 is configured to execute signal processing for causing the steering ECU 14 to communicate with other in-vehicle devices such as a master ECU 13 according to a predetermined standard.

The master ECU 13 is a control unit configured to control main driving operation of the vehicle 10, and is coupled to the steering ECU 14 via a steering roll connector (SRC) and a CN1 (connector-1). The SRC may be omitted. The CN1 to the CN3 may be combined into one.

An automatic speed control unit 15 is configured to implement the above-described automated driving function, and is coupled to the master ECU 13.

A notifying limit 16 may be a display device, a sound a generation device, or the like, and is configured to execute notification according to a processing result of the sensing unit 142. For example, as will be described later, when it is determined that the touch sensor 125 has failed, the driver is notified via the notifying unit 16 that the touch sensor 125 has failed.

Figure 3:
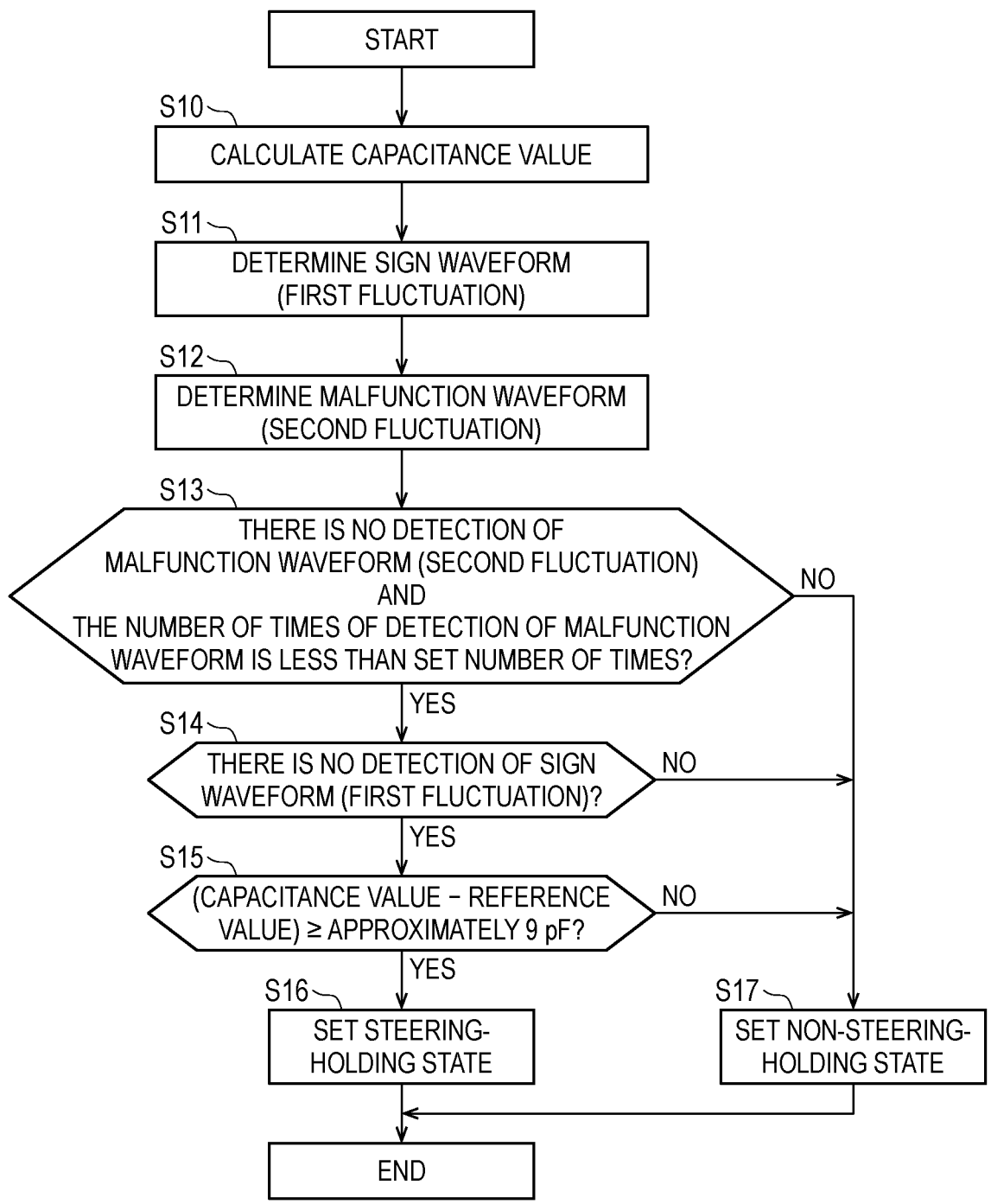
FIG. 3 is a flowchart illustrating operation of the vehicle driving system.
Figure 4A:
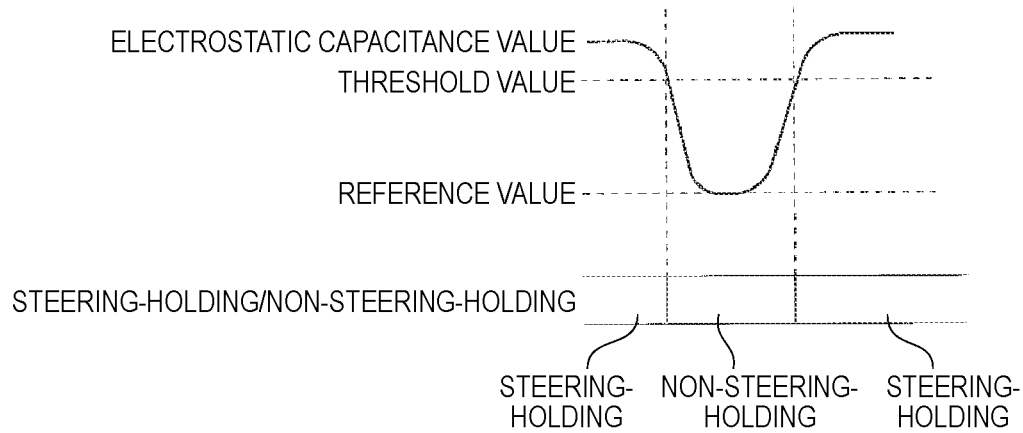
FIG. 4A is a timing chart illustrating a change in an electrostatic capacitance value in steering-holding state and non-steering-holding state.
Figure 4B:
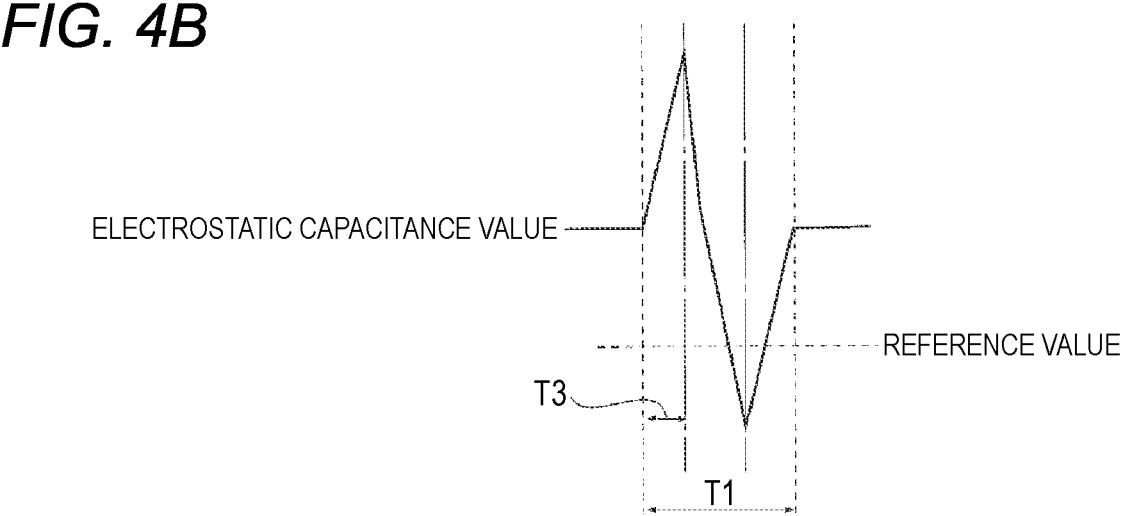
FIG. 4B is a timing chart illustrating a first fluctuation.
Figure 4C:
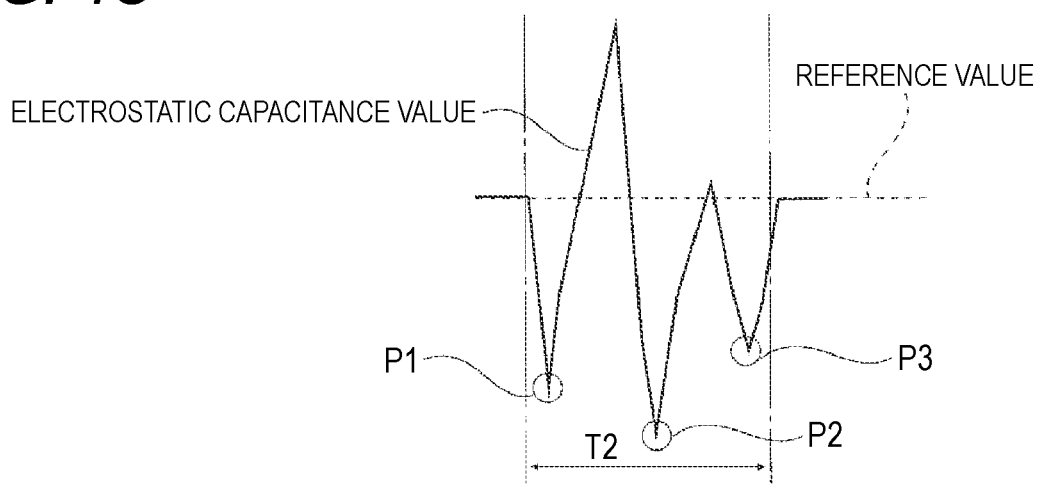
FIG. 4C is a timing chart illustrating a second fluctuation.

Basic operation of the vehicle driving system 11 will be described with reference to FIGS. 3, 4A, 4B, and 4C. FIG. 3 is a flowchart illustrating operation when the vehicle driving system 11 determines the steering-holding state or the non-steering-holding state. FIG. 4A is a timing chart illustrating a change in the electrostatic capacitance value in the steering-holding state and the non-steering-holding state. FIG. 4B is a timing chart illustrating the first fluctuation. FIG. 4C is a timing chart illustrating the second fluctuation.

In step S10, the steering ECU 14 calculates the electrostatic capacitance value. FIG. 4A is a chart illustrating a time-dependent fluctuation of the electrostatic capacitance value. The electrostatic capacitance value is indicated by a solid line, and a threshold value and a reference value are indicated by a dotted line. The electrostatic capacitance value indicates a value that is away from the reference value in the steering-holding state, and indicates a value that is close to the reference value in the non-steering-holding state. Here, when the electrostatic capacitance value exceeds the threshold value, it is determined that the driver is in the steering-holding state.

In step S11, the steering ECU 14 determines the first fluctuation, which is a waveform indicating a sign of the malfunction of the touch sensor 125. FIG. 4B illustrates an example of the first fluctuation. The first fluctuation is a fluctuation in which the electrostatic capacitance is lower than a predetermined reference value (a first reference value) during a predetermined first set time T1 (for example, several tens milliseconds). Specifically, after the electrostatic capacitance value has risen once at a time point of a first time T3 (for example, several tens milliseconds shorter than the first set time T1) during the first set time T1, the electrostatic capacitance value falls below the reference value, and then returns to an original value. When the electrostatic capacitance value indicates this short-term fluctuation, it is predicted that the fiber conductive material forming the touch sensor 125 described above has started to deteriorate.

In step S12, the steering ECU 14 determines the second fluctuation, which is a waveform indicating the malfunction of the touch sensor 125. FIG. 4C shows an example of the second fluctuation. The second fluctuation is different from the first fluctuation, and is a fluctuation in the electrostatic capacitance generated when the touch sensor 125 fails. Specifically, the second fluctuation is a fluctuation in which the electrostatic capacitance is fairly lower than a predetermined reference value (a second reference value) during a predetermined second set time T2 (for example, several seconds). The second reference value may be the same value as the above-described first reference value or may be a value different from the first reference value.

The electrostatic capacitance value rapidly decreases at three timings (P1, P2, and P3) during the second set time T2. During the second set time T2, the second fluctuation may be determined by measuring one time of rapid decrease, or may be determined by measuring a plurality of times of rapid decrease.

When the electrostatic capacitance value indicates the second fluctuation, it is highly possible that the fiber conductive material forming the touch sensor 125 described above is deteriorating, that is, the touch sensor 125 has failed.

In step S13, the steering ECU 14 determines whether there is no second fluctuation, which is a waveform indicating the malfunction of the touch sensor 125, and the number of times of detection of the waveform indicating the malfunction is less than a predetermined set number of times.

In a case of YES in step S13, that is, in a case in which there is no second fluctuation, which is a waveform indicating the malfunction of the touch sensor 125, and the number of times of detection of the waveform indicating the malfunction is less than the set number of times, the steering ECU 14 proceeds to step S14.

In a case of NO in step S13, that is, in a case in which there is the second fluctuation, which is a waveform indicating the malfunction of the touch sensor 125, or in a case in which the number of times of detection of the waveform indicating the malfunction is equal to or more than the set number of times, the steering ECU 14 proceeds to step S17.

In step S14, the steering ECU 14 determines whether there is no first fluctuation, which is a waveform indicating the sign of the malfunction of the touch sensor 125.

In a case of YES in step S14, that is, in a case in which there is no first fluctuation, which is a waveform indicating the sign of the malfunction of the touch sensor 125, the steering ECU 14 proceeds to step S15.

In a case of NO in step S14, that is, in a case in which there is the first fluctuation, which is a waveform indicating the sign of the malfunction of the touch sensor 125, the steering ECU 14 proceeds to step S17.

In step S15, the steering ECU 14 determines whether a capacitance fluctuation value obtained by subtracting the reference value from the electrostatic capacitance value measured by the touch sensor 125 is equal to or more than 9 pF (picofarad), which is an example of a predetermined value.

In a case of YES in step S15, that is, if the capacitance variation value is equal to or more than 9 pF, the steering ECU 14 proceeds to step S16.

In the case of NO in step S15, if the capacitance variation value is less than 9 pF, the steering ECU 14 proceeds to step S17.

In step S16, it is determined that the driver is in the steering-holding state. That is, the steering ECU 14 determines that the driver is holding the steering operation device 12. If the steering ECU 14 determines that the driver is in the steering-holding state, it is possible to shift from the high level automated driving to the low level automated driving.

In step S17, the steering ECU 14 determines that the driver is in the non-steering-holding state. That is, the steering ECU 14 determines that the driver is not in contact with the steering operation device 12 or is not sufficiently holding the steering operation device 12 with approximately two fingers even if the driver is in contact with the steering operation device 12. If the steering ECU 14 determines that the driver is in the non-steering-holding state, the transition from the high level automated driving to the low level automated driving is prohibited.

By this operation, the vehicle driving system 11 determines the steering-holding state or the non-steering-holding state.

Figure 5:
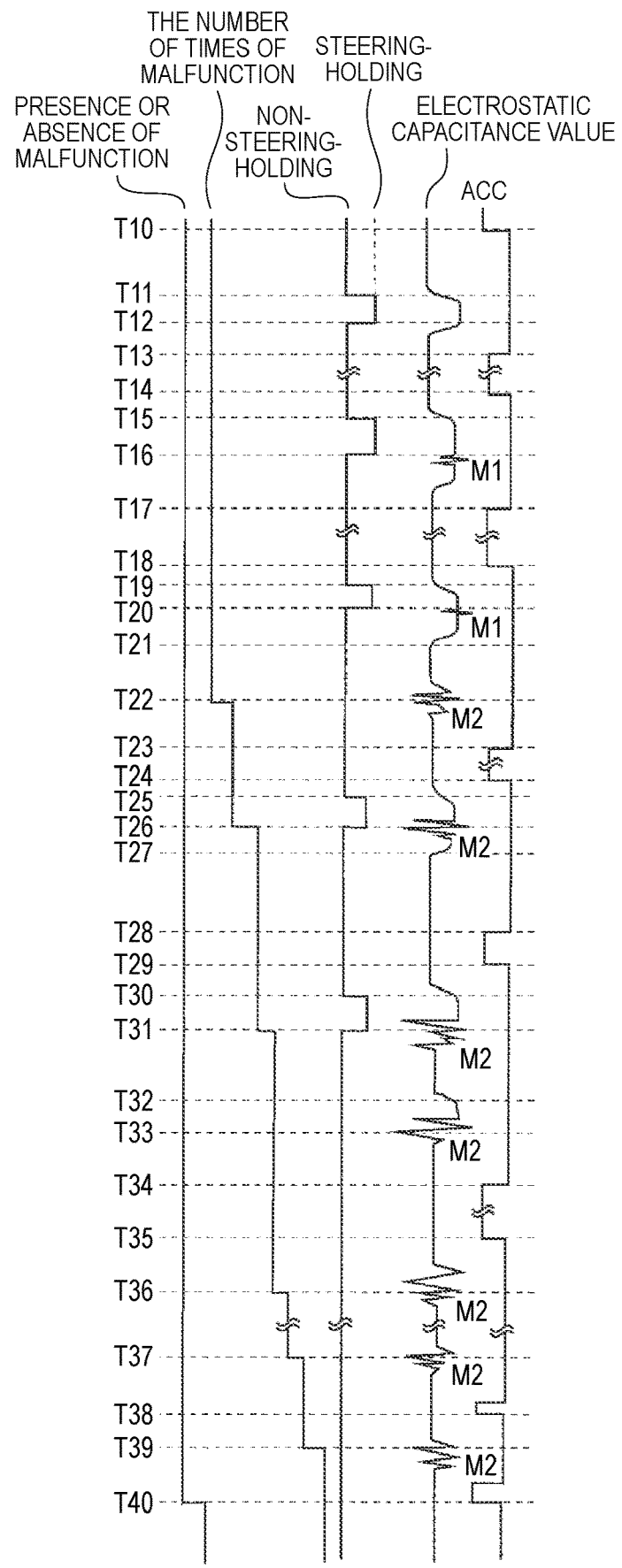
FIG. 5 is a timing chart illustrating in detail the operation of the vehicle driving system.

FIG. 5 is a timing chart illustrating in detail an example of the operation of the vehicle driving system 11.

In FIG. 5, the chart illustrates, from the top, adaptive cruise control (ACC) indicating the operation and the stop of an engine, the electrostatic capacitance value indicating an output value of the touch sensor 125, the determination of the steering-holding state or the non-steering-holding state, the number of times the second fluctuation predicting the malfunction of the touch sensor 125 has been detected, and the presence or absence of the malfunction of the touch sensor 125.

The first fluctuation indicating the sign of the malfunction of the touch sensor 125 described above is denoted by M1, and the second fluctuation indicating the malfunction of the touch sensor 125 is denoted by M2. In the following description. T10 and the like indicate time points.

During a period from T10 to T11, when the user starts the engine, the electrostatic capacitance value measured by the touch sensor 125 does not indicate an increase. Therefore, the steering ECU 14 determines that the driver is in the non-steering-holding state.

During a period from T11 and T12, the electrostatic capacitance value increases by a predetermined value or more (for example, 20 pF or more), and the steering ECU 14 determines that the driver is in the steering-holding state.

From T12 to T13, since the electrostatic capacitance value does not indicate an increase, the steering ECU 14 determines that the driver is in the non-steering-holding state.

From T13 to T14, the engine of the vehicle 10 is stopped, that is, the vehicle 10 is stopped.

From T14 to T15, since the engine of the vehicle 10 is restarted and the electrostatic capacitance value does not indicate an increase, the steering ECU 14 determines that the driver is in the non-steering-holding state.

From T15 to T16, the electrostatic capacitance value increases by the predetermined value or more, and the steering ECU 14 determines that the driver is in the steering-holding state.

Thereafter, since the touch sensor 125 shows the first fluctuation M1, the steering ECU 14 fixes the determination to the non-steering-holding state. That is, even if the fluctuation in the electrostatic capacitance value measured by the touch sensor 125 indicates the steering-holding state, the steering ECU 14 continues to determine that the driver is in the non-steering-holding state from T16 to T17.

At T17, the driver stops the engine of the vehicle 10, and the vehicle 10 stops or is parked. When the engine of the vehicle 10 is stopped, the steering ECU 14 cancels the fixing of the determination to the non-steering-holding state. In this way, at T18, when the engine of the vehicle 10 is driven again to resume the traveling, the steering ECU 14 can determine the steering-holding state or the non-steering-holding state based on the output of the touch sensor 125. The canceling of the fixing of the determination to the non-steering-holding state may be predetermined operation of the driver, for example, operation of canceling the automatic speed control.

From T18 to T19, since the electrostatic capacitance value does not indicate an increase, the steering ECU 14 determines that the driver is in the non-steering-holding state.

From T19 to T20, the electrostatic capacitance value increases by the predetermined value or more, and the steering ECU 14 determines that the driver is in the steering-holding state.

Thereafter, since the electrostatic capacitance value indicates the first fluctuation M1, the steering ECU 14 fixes the determination to the non-steering-holding state.

From T20 to T21, although the electrostatic capacitance value increases by a predetermined value or more (for example, 20 pF or more), the steering ECU 14 determines that the driver is in the non-steering-holding state since the first fluctuation M1 has occurred.

At T22, the steering ECU 14 detects the second fluctuation M2 based on the output of the touch sensor 125. The steering ECU 14 stores that the number of times the second fluctuation M2 has occurred is one.

From T23 to T24, the engine of the vehicle 10 is stopped.

From 124 to T25, since the electrostatic capacitance value does not indicate an increase, the steering ECU 14 determines that the driver is in the non-steering-holding state.

From T25 to T26, the electrostatic capacitance value measured by the touch sensor 125 increases by the predetermined value or more, and the steering ECU 14 determines that the driver is in the steering-holding state.

At T26, the steering ECU 14 detects the second fluctuation M2 based on the output of the touch sensor 125, and stores that the number of times the second fluctuation M2 has occurred is two.

From T26 to T27, although the electrostatic capacitance value measured by the touch sensor 125 increases by the predetermined value or more, the steering ECU 14 determines that the driver is in the non-steering-holding state since the second fluctuation M2 has been detected at T26. When the engine is stopped at T28, or by the predetermined operation of the driver described above, the steering ECU 14 stops the determination that the driver is in the non-steering-holding state.

From T28 to T29, the engine of the vehicle 10 is stopped.

From T29 to T30, since the electrostatic capacitance value does not indicate an increase, the steering ECU 14 determines that the driver is in the non-steering-holding state.

From T30 to T31, the electrostatic capacitance value measured by the touch sensor 125 increases by the predetermined value or more, and the steering ECU 14 determines that the driver is in the steering-holding state.

At T26, the steering ECU 14 detects the second fluctuation M2 based on the output of the touch sensor 125, and stores that the number of times the second fluctuation M2 has occurred is three.

At T32, although the electrostatic capacitance value fluctuates, the steering ECU 14 determines that the driver is in the non-steering-holding state since the second fluctuation M2 has been detected at T31.

At T33, the steering ECU 14 detects the second fluctuation M2 via the touch sensor 125, but does not count the second fluctuation M2 as the number of times of the malfunction since the second fluctuation M2 has been detected at T31. In this way, it is possible to more accurately detect the presence or absence of the malfunction.

From T34 to T35, the engine of the vehicle 10 is stopped.

At T36, the steering ECU 14 detects the second fluctuation M2, and stores that the number of times the second fluctuation M2 has occurred is four.

At T37, the steering ECU 14 detects the second fluctuation M2, and stores that the number of times the second fluctuation M2 has occurred is five.

At T38, after the engine has been started, the steering ECU 14 determines that the driver is in the non-steering-holding state even if the touch sensor 125 measures a large change in the electrostatic capacitance value. Here, the determination that the driver is in the non-steering-holding state is continued, even in the situation of a stop of the engine, an operation of the driver, or the like. When the second fluctuation M2 frequently occurs, there is a large possibility that the touch sensor 125 has failed. Therefore, it is possible to prevent a misjudgment that the driver is in the steering-holding state even though the driver is actually in the non-steering-holding state.

At T39, the steering ECU 14 detects the second fluctuation M2 and stores that the number of times the second fluctuation M2 has occurred is a predetermined number of times for determining that the malfunction has occurred.

At T40, when the user starts the engine, the steering ECU 14 determines that the number of times the second fluctuation M2 has been detected reaches a certain value and the touch sensor 125 has failed, and notifies, from the notifying unit 16, the driver of a fact that the touch sensor 125 has failed. Based on the notification, the driver can bring the vehicle 10 to a car dealer or the like to repair the touch sensor 125.

The embodiment described above would achieve the following main effects.

According to the vehicle driving system 11 in the disclosure, it is possible to prevent the misjudgment that the driver is in the steering-holding state even though the driver is actually in the non-steering-holding state, by determining that the driver is in the non-steering-holding state after a pre-destruction fluctuation has been detected. Therefore, it is possible to prevent the transition from the high level automated driving to the low level automated driving in the non-steering-holding state. The vehicle driving system 11 would reliably detect that the driver performs the hand releasing driving and prompt the driver to hold the steering operation device via the notifying unit 16.

Further, when the vehicle 10 is driven again by canceling the determination that the driver is in the non-steering-holding state when the operation performed by the driver or the engine is stopped, it is possible to determine the steering-holding state or the non-steering-holding state based on the output of the touch sensor 125.

Further, when the vehicle 10 is driven again by canceling the determination that the driver is in the non-steering-holding state when the driver performs operation to cancel the automatic speed control, it is possible to determine the steering-holding state or the non-steering-holding state based on the output of the touch sensor 125.

Further, when a post-destruction fluctuation in which the electrostatic capacitance largely fluctuates is detected, it is possible to prevent, by determining that the driver is in the non-steering-holding state, the misjudgment that the driver is in the steering-holding state even though the driver is actually in the non-steering-holding state.

Further, when the number of times the second fluctuation M2 has been detected reaches a certain value or more, by executing the malfunction determination, it is possible to determine that a rapid change in the electrostatic capacitance is not accidental but due to the malfunction.

Further, by notifying the driver that the touch sensor 125 has failed, it is possible to call the driver to repair the touch sensor 125.

Further, it is possible to more accurately detect the first fluctuation M1, and to prevent the vehicle driving system 11 from misjudging the non-steering-holding state as the steering-holding state.

Further, it is possible to more accurately detect the second fluctuation M2, to prevent the vehicle driving system 11 from misjudging the non-steering-holding state as the steering-holding state, and further to detect the malfunction of the touch sensor 125 at an early stage.

Although the embodiments of the disclosure have been described above, the disclosure is not limited thereto, and modifications can be made without departing from the gist of the disclosure. The above-described embodiments can be combined with one another.

For example, in the embodiment described above, the vehicle driving system 11 is mounted on the vehicle 10 having the automated driving function. However, the vehicle driving system 11 may be mounted on the vehicle 10 having no automated driving function.

Further, when the driver performs the hand releasing driving of releasing the hand from the steering operation device 12, the vehicle driving system 11 would prompt the operation of the steering operation device 12 via the notifying unit 16.

Further, the touch sensor 125 recognizes a tendency for the driver to grip the steering operation device 12, and the vehicle driving system 11 would prompt a correct steering position, a gripping method (a force and an area), and the like via the notifying unit 16.

Further, the touch sensor 125 would recognize the operation of the user operating the steering operation device 12, and the vehicle driving system 11 would delay a warning via the notifying unit 16 for the user who is appropriately operating the steering operation device 12.

Further, at the time of high speed traveling in which the vehicle 10 travels at a high speed, a threshold value for determining the steering-holding state may be set higher than that at the time of low speed traveling. Further, the vehicle driving system 11 may also determine that the driver is in the steering-holding state only when the touch sensor 125 confirm the steering-holding state with both hands at the time of high speed traveling.

Further, when the vehicle 10 is provided with a vehicle interior imaging unit or the like and the driver is careless for the front or dozing according to the output of the vehicle interior imaging unit, the vehicle driving system 11 may issue a warning via the notifying unit 16 to prompt the driver to hold the steering operation device.

Further, the touch sensor 125 of the steering operation device 12 may function as a so-called touch pad, and may also be used as a navigation device, an audio device, a turn signal, and a paddle shift.

Further, the threshold value illustrated in FIG. 4A may be appropriately changed according to factors such as grip strength, a contact area, a vehicle interior temperature, gender and an age of the driver, and the like.

Further, the vehicle driving system 11 may determine not only whether the driver is in the steering-holding state or the non-steering-holding state but also other items. For example, the vehicle driving system 11 may determine, based on the output of the touch sensor 125, whether the state of steering-holding state and non-steering-holding state is safe for performing steering by detecting in detail the steering-holding state or the non-steering-holding state of the driver.

What is claimed is:

1. A vehicle driving system that is to be provided in a vehicle, the vehicle driving system comprising:
    a touch sensor that is provided in a steering operation device of the vehicle, the touch sensor being configured to detect an electrostatic capacitance generated between the steering operation device and a driver of the vehicle; and
    a control unit configured to:
        receive, from the touch sensor, the electrostatic capacitance;
        when the received electrostatic capacitance indicates a first electrostatic capacitance value, determine that the driver of the vehicle is in a steering-holding state in which the driver is holding the steering operation device;
        when the received electrostatic capacitance indicates a second electrostatic capacitance value, determine that the driver is in a non-steering-holding state in which the driver is not holding the steering operation device; and
        when the received electrostatic capacitance indicates a first fluctuation, determine that a malfunction occurred in the touch sensor,
    wherein, when the control unit receives, after the control unit detects the first fluctuation in the electrostatic capacitance indicating the malfunction of the touch sensor, the first electrostatic capacitance value indicating the steering-holding state of the driver, the control unit determines that the driver is in the non-steering-holding state.

2. The vehicle driving system according to claim 1, wherein the control unit cancels the determination that the driver is in the non-steering-holding state in response to a predetermined operation of the driver or a stop of an engine of the vehicle.

3. The vehicle driving system according to claim 2, further comprising:
    an automatic speed control unit configured to execute automatic speed control in which a traveling speed of the vehicle is automatically controlled,
    wherein the predetermined operation of the driver is an operation of cancelling the automatic speed control.

4. The vehicle driving system according to claim 1, wherein, after the control unit detects a second fluctuation, the control unit makes the determination that the driver is in the non-steering-holding state even when the control unit receives, from the touch sensor, the second electrostatic capacitance value indicating that the driver is in the steering-holding state, the second fluctuation being different from the first fluctuation and being a fluctuation in the electrostatic capacitance occurring in response to the malfunction of the touch sensor.

5. The vehicle driving system according to claim 2, wherein, after the control unit detects a second fluctuation, the control unit makes the determination that the driver is in the non-steering-holding state even when the control unit receives, from the touch sensor, the second electrostatic capacitance value indicating that the driver is in the steering-holding state, the second fluctuation being different from the first fluctuation and being a fluctuation in the electrostatic capacitance occurring in response to the malfunction of the touch sensor.

6. The vehicle driving system according to claim 3, wherein, after the control unit detects a second fluctuation, the control unit makes the determination that the driver is in the non-steering-holding state even when the control unit receives, from the touch sensor, the second electrostatic capacitance value indicating that the driver is in the steering-holding state, the second fluctuation being different from the first fluctuation and being a fluctuation in the electrostatic capacitance occurring in response to the malfunction of the touch sensor.

7. The vehicle driving system according to claim 4, wherein the control unit determines that the touch sensor malfunctioning in a case where a number of times the second fluctuation is detected reaches a certain number.

8. The vehicle driving system according to claim 5, wherein the control unit determines that the touch sensor malfunctioning in a case where a number of times the second fluctuation is detected reaches a certain number.

9. The vehicle driving system according to claim 6, wherein the control unit determines that the touch sensor malfunctioning in a case where a number of times the second fluctuation is detected reaches a certain number.

10. The vehicle driving system according to claim 4, further comprising
a notifying unit,
wherein, when the control unit determines that the touch sensor is malfunctioning, the control unit notifies, via the notifying unit, the driver that the touch sensor is malfunctioning.

11. The vehicle driving system according to claim 5, further comprising
a notifying unit,
wherein, when the control unit determines that the touch sensor is malfunctioning, the control unit notifies, via the notifying unit, the driver that the touch sensor is malfunctioning.

12. The vehicle driving system according to claim 6, further comprising
a notifying unit,
wherein, when the control unit determines that the touch sensor is malfunctioning, the control unit notifies, via the notifying unit, the driver that the touch sensor is malfunctioning.

13. The vehicle driving system according to claim 1, wherein the first fluctuation is a fluctuation in the electrostatic capacitance in a first set time.

14. The vehicle driving system according to claim 4, wherein the second fluctuation is a fluctuation in the electrostatic capacitance in a second set time.

15. The vehicle driving system according to claim 5, wherein the second fluctuation is a fluctuation in the electrostatic capacitance in a second set time.

16. The vehicle driving system according to claim 6, wherein the second fluctuation is a fluctuation in the electrostatic capacitance in a second set time.

17. A vehicle driving system to be provided in a vehicle, the vehicle driving system comprising:
a touch sensor that is to be provided in a steering operation device of the vehicle and that is configured to detect an electrostatic capacitance generated between the steering operation device and a driver of the vehicle;
a memory that stores instructions; and
a processor configured to execute the instructions,
wherein the instructions cause the processor to:
receive, from the touch sensor, the electrostatic capacitance;
receive, from the touch sensor, the electrostatic capacitance;
when the received electrostatic capacitance indicates a first electrostatic capacitance value, determine that the driver of the vehicle is in a steering-holding state in which the driver is holding the steering operation device;
when the received electrostatic capacitance indicates a second electrostatic capacitance value, determine that the driver is in a non-steering-holding state in which the driver is not holding the steering operation device; and
when the received electrostatic capacitance indicates a first fluctuation, determine that a malfunction occurred in the touch sensor,
wherein, when the processor receives, after the processor detects the first fluctuation in the electrostatic capacitance indicating the malfunction of the touch sensor, the first electrostatic capacitance value indicating the steering holding state of the driver, the processor determines that the driver is in the non-steering-holding state.

* * * * *